United States Patent [19]

Kubo et al.

[11] Patent Number: 4,621,548
[45] Date of Patent: Nov. 11, 1986

[54] MACHINE TOOL HOLDER UNIT

[75] Inventors: Haruaki Kubo; Hidemori Kawashita, both of Higashiosaka, Japan

[73] Assignee: Daishowa Seiki Co., Ltd., Osaka, Japan

[21] Appl. No.: 607,293

[22] Filed: May 4, 1984

[30] Foreign Application Priority Data

May 16, 1983 [JP] Japan ................................ 58-85614
Jan. 21, 1984 [JP] Japan ................................ 59-9147

[51] Int. Cl.⁴ .......................................... B23B 29/034
[52] U.S. Cl. .................................... 82/1.2; 408/158; 408/161; 408/179
[58] Field of Search ................. 82/1.2, 1.3, 1.4, 2 E, 82/2 A, 4 R, 4 C; 408/181, 153, 158, 161, 168, 179

[56] References Cited

U.S. PATENT DOCUMENTS

| | | | |
|---|---|---|---|
| 2,409,578 | 10/1946 | McDonald | 82/2 E |
| 3,067,637 | 12/1962 | Horning | 82/1.2 |
| 3,101,631 | 8/1963 | Huff | 408/153 |
| 3,344,693 | 10/1967 | Scholl | 82/1.2 |
| 4,447,177 | 5/1984 | Ochiai et al. | 408/161 |
| 4,463,633 | 8/1984 | Grimsley | 82/4 R |

Primary Examiner—Francis S. Husar
Assistant Examiner—Jerry Kearns
Attorney, Agent, or Firm—Koda and Androlia

[57] ABSTRACT

An interchangeable machine tool holder unit for use in a machining apparatus for the support of a machining element, for example, a cutting bit, which includes an elongated rotary body adapted to be driven in one direction about the longitudinal axis thereof, a tool holder supported in end-to-end fashion by the rotary body for movement in a direction radially of the rotary body, an axially displaceable member axially displaceably carried inside the rotary body, and an indexing mechanism for causing the axially displaceable member to move in the axial direction each time the rotary body undergoes one complete rotation to permit the tool holder to move in the radial direction. During the continued rotation of the rotary body in one direction, the displaceable member is axially moved in response to each complete rotation of the rotary body, and the movement of the displaceable member results in a radial shift of the tool holder to permit the cutting bit to effect counterboring, drilling or cutting of a workpiece.

12 Claims, 16 Drawing Figures

MACHINE TOOL HOLDER UNIT

BACKGROUND OF THE INVENTION

1. Field of the Invention

The present invention generally relates to a numerically controlled machining apparatus such as, for example, a lathe, a planer, a drilling machine, a cutting machine and a milling machine, and, more particularly, to an interchangeable machine tool holder unit for use in such apparatus for the support of a rotary cutter which may be used for forming a precisely dimensioned bore or for forming an O-ring seat within the bore.

2. Prior Art

A machine tool holder unit includes a generally elongated rotary body adapted to be interchangeably coupled to a machine spindle for rotation together therewith, the free end of which has a tool holder movable in a direction radially thereof. When in use, the tool holder is moved together with the rotary body during the rotation of the rotary body to allow a cutting element mounted in the vicinity of the tool holder to revolve about the longitudinal axis of the rotary body so that the tool holder can be moved in a direction radially of the rotary body. In the machine tool holder unit, the distance over which the tool holder is radially moved each time the rotary body undergoes a complete rotation about its longidutinal axis driven by the machine spindle is required to be very small, for example, one thousandth of a millimeter and, in addition, the tool holder unit itself must be of a precise design. Therefore, the tool holder unit must have a complicated mechanism built therein.

In view of the foregoing requirements to be fulfilled, a highly reliable, durable and precise tool holder unit has not yet been developed.

SUMMARY OF THE INVENTION

Accordingly, the present invention has been developed with a view toward providing a machine tool holder unit satisfying the above discussed requirements and has as an essential object to provide an improved machine tool holder unit wherein the tool holder can be moved in a direction radially of the rotary body an extremely small distance for one complete rotation of the rotary body to enable a workpiece to be precisely machined, i.e., to form a precisely dimensioned bore or an O-ring seat within the bore.

Another object of the present invention is to provide an improved machine tool holder unit of the type referred to above, which can be manufactured with a minimized number of component parts.

A further object of the present invention is to provide an improved machine tool holder unit of the type referred to above, wherein an indexing means for moving the tool holder in a direction radially of the rotary body is constructed so as to permit the tool holder unit to be smoothly and precisely moved.

BRIEF DESCRIPTION OF THE DRAWINGS

These and other objects and features of the present invention will become clear from the following description of the preferred embodiments thereof made with reference to the accompanying drawings, in which.

DETAILED DESCRIPTION OF THE INVENTION

Before the description of the embodiments of the present invention proceeds, it should be noted that, for the purpose of the description of the present invention, the interchangeable machine tool holder unit embodying the present invention will be described as used for the support of a cutting bit for precisely counterboring to finish a bored hole to a precise dimension.

Referring first to FIGS. 1 to 4, an interchangeable machine tool holder unit according to a first preferred embodiment of the present invention includes a generally elongated rotary body 1 having a drive section 1a and a carriage section 1b for the support of a tool holder 4. The carriage section 1b is connected rigidly with the drive section 1a for rotation together therewith by means of at least one stopper pin 5 and a connecting bolt 6. The drive section 1a includes a circumferentially grooved ring 2 rigidly mounted thereon for engagement with a manipulator arm (not shown) at the time of replacement of the tool holder unit, which may be carried out automatically as is well known to those skilled in the art, and a shank 3 tapering outwardly from the ring 2 in coaxial relation thereto and adapted to be detachably connected to a machine spindle 48 for rotation together therewith. The machine spindle 48 is rotatably carried by a machine headstock 50 through a bearing assembly 49. A support barrel 7 is mounted exteriorly on the carriage section 1b through a plurality of axially spaced bearings 8 with the rotary body 1 rotatably extending therethrough and has a lateral projection 7a formed integrally therewith so as to extend radially outwardly therefrom. The projection 7a receives therein an air feed pipe 9 in the manner which will now be described below.

Figure 1:
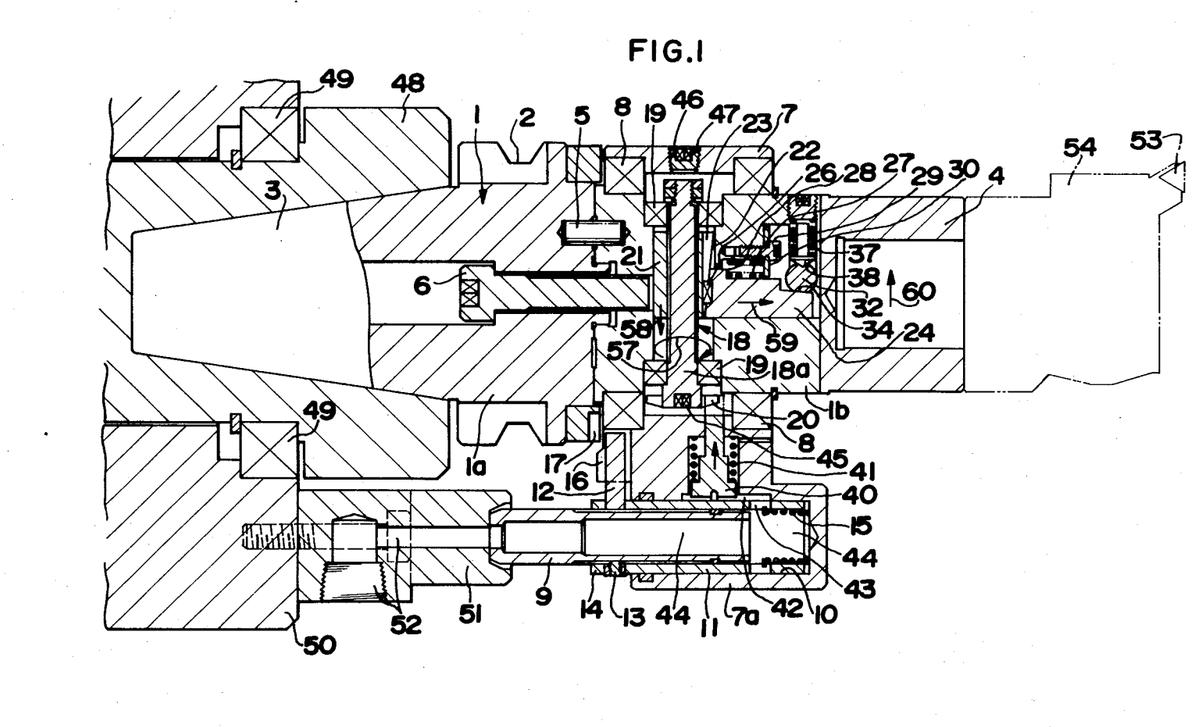
FIG. 1 is a side sectional view of an interchangeable machine tool holder unit according to a first preferred embodiment of the present invention.

The air feed pipe 9 has one end portion axially slidably inserted in an inner sleeve 11 received within a bore 10 which is defined in the lateral projection 7a so as to extend in an axial direction parallel to the longitudinal axis of the rotary body 1. The air feed pipe 9 also serves as a positioning element for avoiding any possible rotation of the support barrel 7 relative to the rotary body 1 and, for this purpose, the air feed pipe 9 has a stopper 12 exteriorly mounted thereon and adjustably held in position thereon by means of a lock nut 14 and a set screw 13. The stopper 12 extends radially outwardly from the air feed pipe 9. Thus, it will readily be seen that, by adjusting the lock nut 14 and the set screw 13, the position of the stopper 12 relative to the air feed pipe 9 can be adjusted.

The inner sleeve 11 within the bore 10 in the lateral projection 7a is normally biased so as to project outwardly by means of a biasing spring 15 housed within the bore 10 with an outer end of the inner sleeve 11 consequently abutting the stopper 12. The stopper 12 is loosely engaged in a recess 16 defined in the support barrel 7; but when and so long as both the air feed pipe 9 and the inner sleeve 11 are outwardly projected by the action of the biasing spring 15 to assume a projected position (contrary to the retracted position as shown in FIG. 1), the stopper 12 is engaged in a recess 17, defined in the drive section 1a of the rotary body 1, thereby to lock the support barrel 7 to the rotary body 1.

The carriage section 1b of the rotary body 1 has a radial bore in which an indexing mechanism including a movable drive member 18 is operatively accomodated. The movable drive member 18 includes an exteriorly threaded rod 18a which is rotatably, but axially non-movably supported within the radial bore in the carriage section 1b by means of a pair of spaced bearings 19, a sprocket wheel or star wheel 20 secured rigidly to one end of the threaded rod 18a, and an interiorly threaded indexing cam 21 mounted on the threaded rod 18a. The indexing cam 21 has an inclined cam face 22 defined therein and also a key groove 23 defined in the cam face 22 so as to extend in a direction parallel to the longitudinal axis of the threaded rod 18a. The key groove 23 receives therein a key projection 26 which is carried by a generally elongated displacement wedge 24, as will be described later, so that the indexing cam 21 can only move axially of the threaded rod 18a without being rotated relative to the threaded rod 18a.

Figure 3:
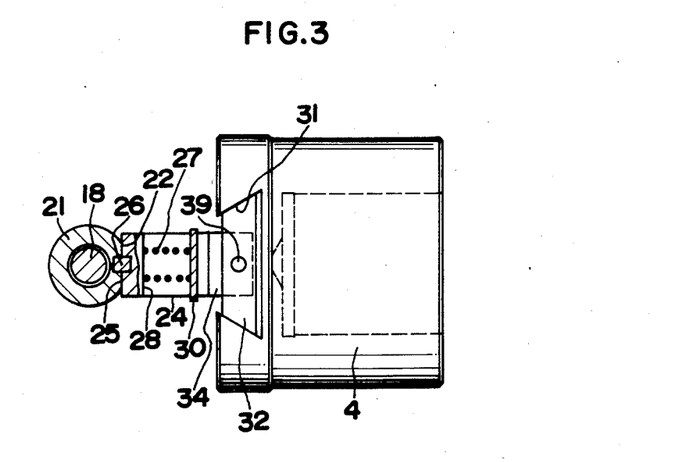
FIG. 3 is a longitudinal sectional view of a portion of the tool holder unit, showing the relationship between a tool holder and an indexing mechanism.
Figure 4:
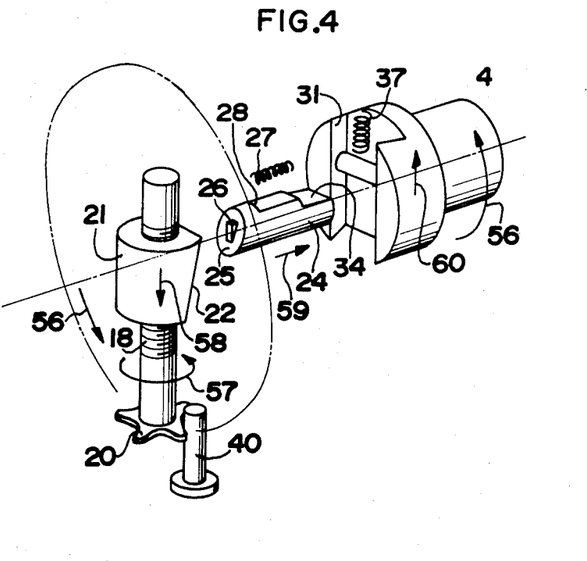
FIG. 4 is an exploded view of the indexing mechanism.

The generally elongated displacement wedge 24 is accommodated within an axial bore in the carriage section 1b at a location between the indexing cam 21 and the tool holder 4 for movement in a direction axially of the rotary body 1 and has, as best shown in FIGS. 3 and 4, one end inclined as at 25 in a direction opposite to the inclination of the cam face 2 in the indexing cam 21 for sliding engagement with the cam face 22. The key projection 26 projects axially outwardly from the inclined end face 25. This displacement wedge 24 is normally biased by a biasing spring 27 with the inclined end face 25 thereof consequently held in sliding contact with the cam face 22, which biasing spring 27 is interposed between a shoulder 28 which is defined in the displacement wedge 24 and a spring retainer 30 secured to the carriage section 1b by means of a set bolt 29.

Figure 2:
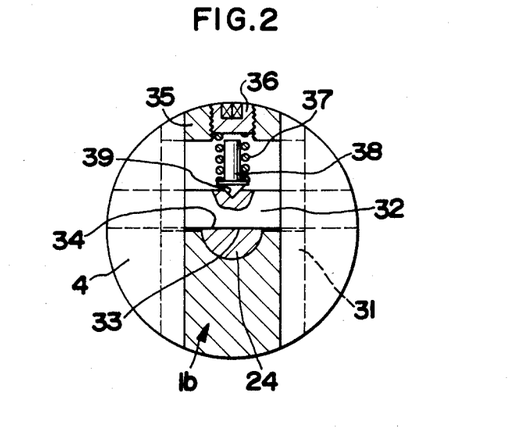
FIG. 2 is a cross sectional view of the tool holder unit shown in FIG. 1, showing the relationship between a follower pin and a displacement wedge both used in the tool holder unit.

As best shown in FIGS. 2 to 4, the tool holder 4 having a socket 4a defined therein so as to open in a direction opposite to the rotary body 1 has a closed end formed with a dovetail groove 31 extending in a radial direction thereof, through which the dovetail groove 31 and the tool holder 4 are coupled to and carried by the carriage section 1b of the rotary body 1 for movement in a direction radially of the rotary body 1. The tool holder 4 also has a follower pin 32 carried thereby so as to traverse the dovetail groove 31. The follower pin 32 has a flat engagement face 33 defined therein. With the follower pin 32 so supported by the tool holder 4 so as to traverse the dovetail groove 31 in the manner as hereinabove described, the flat engagement face 33 thereof is constantly held in contact with an inclined cam face 34 defined in the displacement wedge 24 at one end thereof opposite to the inclined end face 25. The constant sliding engagement between the cam face 34 in the displacement wedge 24 and the flat engagement face 33 is effected by the utilization of a biasing force exerted by a spring 37 which is interposed between the follower pin 32 and a plug member 36 threadingly engaged in a dovetail projection 35 of the carriage section 1b engaged slidingly in the dovetail groove 31. In practice, the biasing force of the spring 37 is transmitted to the follower pin 32 through a pusher piece 38 having a generally conical head engaged in a mating indentation 39 defined in the follower pin 32.

Figure 5:
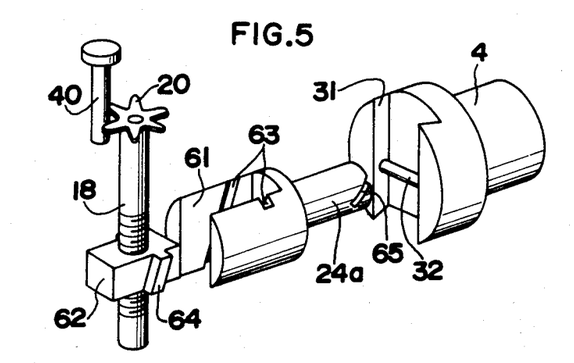
FIG. 5 is an exploded view showing a modified form of the indexing mechanism.

As best shown in FIGS. 1, 4 and 5, the support barrel 7 carries a drive pin 40 accommodated in a bore in the lateral projection 7a so as to extend in a direction at right angles to the axis of rotation of the rotary body 1 with one end thereof positioned in the vicinity of the path of revolution of the sprocket wheel 20 about the longitudinal axis of the rotary body 1, which revolution results from the rotation of the rotary body 1, and at a location engageable with any one of the teeth of the sprocket wheel 20. This drive pin 40 is axially movable between retracted and projected positions and is normally biased towards the retracted position by a spring 41, but is moved towards the projected position against the spring 41 when pressure is introduced into a working chamber 42 which is fluid-connected through a port 43, defined in the inner sleeve 11, with an air chamber 44 defined in the lateral projection 7a in communication with the air feed pipe 9. It is to be noted that, for enabling the adjustment of the position of the exteriorly threaded rod 18a and, hence, the adjustment of the position of the indexing cam 21 relative to the threaded rod 18a at the time of, for example, the initial set-up of the machine, one end of the exteriorly threaded rod 18a adjacent the sprocket wheel 20 is formed with an axial blind hole 45 designed to receive the tip of an adjustment instrument, for example, a screw driver which may be accessible thereto through an access opening 46 defined in the support barrel 7 and normally closed by a plug 47 at a location generally circumferentially opposite to the laterial projection 7a.

Hereinafter, the operation of the machine tool holder unit according to this embodiment of the present invention described with reference to and shown in FIGS. 1 to 5 will be described.

After the tool 54 having a cutting bit 53 has been rigidly inserted into the socket 4a in the tool holder 4 as shown by the phantom line in FIG. 1 in any known manner, the rotary body 1 carrying the tool 54 is coupled to the machine headstock 50 with the shank 3 thereof firmly received within the machine spindle 48. When connecting the rotary body 1 to the machine headstock 50, care should be taken to allow the free end of the air feed pipe 9 to be fluid-tightly connected with an air feed passage 52 defined in a block 51 fast and integral with the machine headstock 50. At this time, upon the contact of the air feed pipe 9 with the block 51 and as the rotary body 1 is connected with the machining spindle 48 with the shank 3 being axially inserted thereinto, all of the air feed pipe 9, the inner sleeve 11 and the stopper 12 are axially displaced against the spring 15. The stopper 12 is then separated from the recess 17 in the rotary body 1 and subsequently engaged in the recess 16 in the support barrel 7. It will, therefore, readily be seen that, at the time of and after the completion of the mounting of the rotary body 1 on the machine spindle 48, the rotary body 1 is rotatable together with the machine spindle 48, but the support barrel 7 is retained in fixed position with the stopper 12 engaged in the recess 16 in the support barrel 7.

When and after the machine is subsequently powered to drive the spindle 48 in one direction to rotate the rotary body 1 coupled therewith in the manner as hereinbefore described, the tool holder 4 is also rotated in a direction shown by the arrow 56 in FIG. 4, i.e., in the same direction as the direction of rotation of the rotary body 1. If compressed air is, during the rotation of the rotary body 1, introduced into the air chamber 44 through the air feed passage 42 in the block 51 and then through the air feed pipe 9, the compressed air then enters the working chamber 42 through the port 43 to displace the drive pin 40 from the retracted position towards the projected position against the spring 41. When the drive pin 20 is in the projected position, one end of the drive pin 20 remote from the working chamber 42 is brought into a position ready to engage with any one of the teeth of the sprocket wheel 20 as is best shown in FIG. 4, which sprocket wheel 20 is then revolving about the axis of rotation of the rotary body 1 together with the rotation of the rotary body 1. Accordingly, each time the rotary body 1 undergoes one complete rotation about the longitudinal axis thereof, the end of the drive pin 20 abuts one of the teeth of the sprocket wheel 20 to rotate the exteriorly threaded rod 18a about its own longitudinal axis. If the sprocket wheel 20 has, for example, five equally spaced teeth, one complete rotation of the rotary body 1 results in the rotation of the threaded rod 18a about its own longitudinal axis through 72° in a direction shown by the arrow 57 in FIG. 1 and FIG. 4.

By the rotation of the threaded rod 18a about its own longitudinal axis, the indexing cam 21, threadingly mounted on the threaded rod 18a, is moved axially of the threaded rod 18a in a direction shown by the arrow 58 in FIGS. 1 and 4. The distance of axial displacement of the indexing cam 21 would be 0.1 mm per 360° rotation of the rotary body 1 if each of adjacent teeth on the threaded rod 18a are spaced 0.5 mm in pitch.

Each time the indexing cam 21 is displaced axially of the threaded rod 18a in the manner as hereinabove described, the displacement wedge 24, having the inclined end face 25 slidingly contacting the cam face 22 in the indexing cam 21, is displaced against the spring 27 in a direction shown by the arrow 59 in FIGS. 1 and 4, that is, in a direction away from the indexing cam 21 and towards the tool holder 4. If the gradient of the cam face 22 is 10/1 in this particular example, the displacement wedge 24 can be moved at a rate of 0.01 mm per 360° rotation of the rotary body 1. Since the inclined cam face 34 of the displacement wedge 24 is slidingly engaged with the flat engagement face 33 of the follower pin 32, the displacement of the displacement wedge 24 in the direction shown by the arrow 59 results in the shift of the follower pin 32 against the spring 37 in a direction perpendicular to the direction of displacement of the displacement wedge 24. Therefore, the tool holder 4 carrying the follower pin 32 in the manner as hereinbefore described is moved in a direction radially of the rotary body 1 and in a direction shown by the arrow 60 in FIGS. 1 and 4, guided by the dovetail projection 35 slidingly engaged in the dovetail groove 31. Again, if the gradient of the cam face 36 is 10/1 in this particular example, it can be readily seen that the tool holder 4 is moved in the radial direction at a rate of 0.001 mm per 360° rotation of the rotary body.

From the foregoing description, it has now become clear that the machine tool holder unit according to the embodiment shown in FIGS. 1 to 4 is so designed that, when and so long as the rotary body 1 carrying the tool 54 with the bit 53 thereon is rotated by the machine spindle 48 in one direction about the longitudinal axis thereof, the exteriorly threaded rod 18a operatively carried by the rotary body 1 within the carriage section 1b so as to extend at right angles to the rotary body 1 revolves about the longitudinal axis of the rotary body 1. However, since at this time the drive pin 40 is held in the projected position in the manner as hereinbefore described, the threaded rod 18a is, while revolving about the longitudinal axis of the rotary body 1, turned about its own longitudinal axis through a predetermined angle with the drive pin 40 abutting one of the teeth of the sprocket wheel 20 each time the rotary body 1 undergoes its 360° rotation. The turn of the threaded rod 18a about its own longitudinal axis during the continued rotation of the rotary body 1 results in the stepwise feed of the indexing cam 21 along the threaded rod 18a, resulting in the axial slide of the displacement wedge 24 followed by the radial shift of the tool holder 4 against the spring 37.

Thus, during the continued rotation of the rotary body 1 about its longitudinal axis, the cutting bit 53 carried by the tool holder 4 through the tool 54 moves, while revolving about the longitudinal axis of the rotary body 1, in a direction radially outwardly from the axis of rotation of the rotary body 1. As hereinbefore described, if the distance of displacement of the indexing cam 21 is 0.1 mm per 360° rotation of the rotary body 1 and the displacement wedge 24 is so designed as to be displaced 0.01 mm in response to the displacement of the indexing cam 21 over a distance of 0.1 mm; and if the gradient of the cam face 34 is selected to be 10/1, the cutting bit 53 being revolved about the longitudinal axis of the rotary body 1 is displaced 0.001 mm per 360° rotation of the rotary body 1 in the direction radially outwardly from the axis of rotation of the rotary body 1. In this way, the drilled hole in a workpiece (not shown), which is presumably supported by a machine tailstock opposite to the machine headstock, can be precisely counterbored. Alternatively, the cutting bit 53 supported in the manner as hereinbefore described may be used for spot facing or countersinking purposes.

After the requisite work has been finished, the rotary body 1 has to be rotated in the reversed direction to move the various movable parts back to their initial positions. Specifically, when the rotary body 1 is rotated in the direction reverse to that described above, the threaded rod 18 is turned in a direction opposite to the direction shown by the arrow 57 to move the indexing cam 21 in a direction reverse to the direction shown by the arrow 58, the displacement wedge 59 being consequently moved in a direction reverse to the direction shown by the arrow 59, resulting in the radially inward shift of the tool holder 4. This can be accomplished automatically by reversing a drive motor for driving the machine spindle 48; it being, however, noted that the above described adjustment to bring the movable parts back to the initial positions can also be carried out manually as will be described subsequently.

Where manual adjustment to bring the movable parts back to the initial positions is desired to be carried out, the supply of the compressed air from a source of the compressed air to the air feed passage 52 has to be interrupted to allow the drive pin 40 to be returned to the retracted position by the action of the spring 41 and the plug 47 closing access opening 46 in the support barrel 7 has to be removed. Then, after the rotary body 1 has been manually rotated until the axial blind hole 45 at the end of the threaded rod 18a adjacent the sprocket wheel 20 is brought into alignment with the access opening 46, the adjustment instrument, that is, the screw driver (not shown) has to be inserted through the access opening 46 with its tip engaged in the blind hole 45. The screw driver is then rotated to turn the threaded rod 18a in the direction reverse to that shown by the arrow 57. In this way, the movable parts of the machine tool holder unit according to the present invention can be returned to the initial positions.

In the foregoing embodiment, the indexing cam 21 has been shown in the form of a cylindrical body having the inclined cam face 22 exteriorly formed thereon and the displacement wedge 24 has been described and shown as having the inclined cam face 34 formed on the outer periphery thereof. However, in the modification shown in FIG. 5, an indexing cam 62 corresponding in function to the indexing cam 21 is in the form of a generally rectangular block threadingly mounted on the threaded rod 18a and having a pair of lateral cam projections 64 integrally formed therewith so as to protrude laterally outwardly therefrom in the opposite directions and inclined a predetermined angle relative to the threaded rod 18a. On the other hand, the displacement wedge 24 has one end formed with a recess to provide a pair of laterally spaced arms 61 for embracing the indexing cam 62 therein, the opposed walls of the respective arms 61 having inclined cam grooves 63 defined therein for sliding engagement with the corresponding lateral cam projections 64. In this construction, it will be readily seen that axial displacement of the indexing cam 62 along the threaded rod 18a, which takes place in a manner similar to that described in connection with the indexing cam 21, results in axial displacement of the displacement wedge 24 with the lateral cam projections 64 slidingly guided in and along the inclined cam grooves 63.

In addition, instead of the employment of the inclined cam face 34 which has been described and shown as formed on the displacement wedge 24 in the foregoing embodiment, the end of the displacement wedge 24 adjacent the follower pin 32 is formed with an inclined slit 65 for receiving therein the follower pin 32. The inclined slit 65 is so shaped and so dimensioned that the axial displacement of the displacement wedge 24 can result in radial shift of the tool holder 4, as is the case with that in the foregoing embodiment.

The arrangement shown in FIG. 5 is effective to permit the machine tool holder unit to function in the same manner as that according to the embodiment shown in and described with reference to FIGS. 1 to 4.

The machine tool holder unit described with reference to and shown in FIGS. 1 to 5 include the rotary body adapted to be mounted on the machine spindle for rotation together therewith, the exteriorly threaded rod operatively carried in and by the rotary body so as to extend radially of the rotary body, the tool holder mounted on one end of the rotary body remote from the machine spindle for movement in a direction radially of the rotary body, the displacement wedge disposed within the rotary body and between the threaded rod and the tool holder, the indexing cam threadingly mounted on the threaded rod and having a first cam means for displacing the displacement wedge in a direction axially of the rotary body as the threaded rod is turned about its own longitudinal axis with the displacement wedge being operatively coupled with the tool holder through a second cam means for translating the axial displacement of the displacement wedge into a linear movement performed by the tool holder in a direction perpendicular to the axis of rotation of the rotary body, and means for turning the threaded rod intermittently through a predetermined angle about the longitudinal axis thereof each time the rotary body undergoes a complete rotation driven by the machine spindle.

Accordingly, by suitably selecting the number of teeth of the sprocket wheel 20, the pitch of the teeth on the threaded rod 18a, and/or the gradient of each cam surface employed, it is possible to allow the cutting bit 53, which is then revolved about the axis of rotation of the rotary body 1, to be radially outwardly displaced at a reduced speed of, for example, one thousandth of the speed of rotation of the rotary body. Therefore, the counterboring can be carried advantageously to a precise diameter.

The machine tool holder unit according to another preferred embodiment of the present invention will now be described with particular reference to FIGS. 6 to 10.

Referring to FIGS. 6 to 10, the machine tool holder unit according to the second preferred embodiment includes a generally elongated rotary block 101 coaxially connected with a shank 103 for rotation together therewith by means of at least one pin 105 and a connecting bolt 106. The pin 105 serves to avoid any possible relative rotation of the rotary block 101 relative to the shank 103. A support barrel 107 generally identical in structure with the support barrel 107 in the foregoing embodiment is mounted on the rotary block 101 through a pair of spaced bearings 108 and has a laterial projection 107a integrally formed therewith as is the case with the lateral projection 7a of the support barrel 7. The support barrel 107, when the machine tool holder unit is in use, is held in fixed position in a manner similar to that described in connection with the foregoing embodiment.

Figure 6:
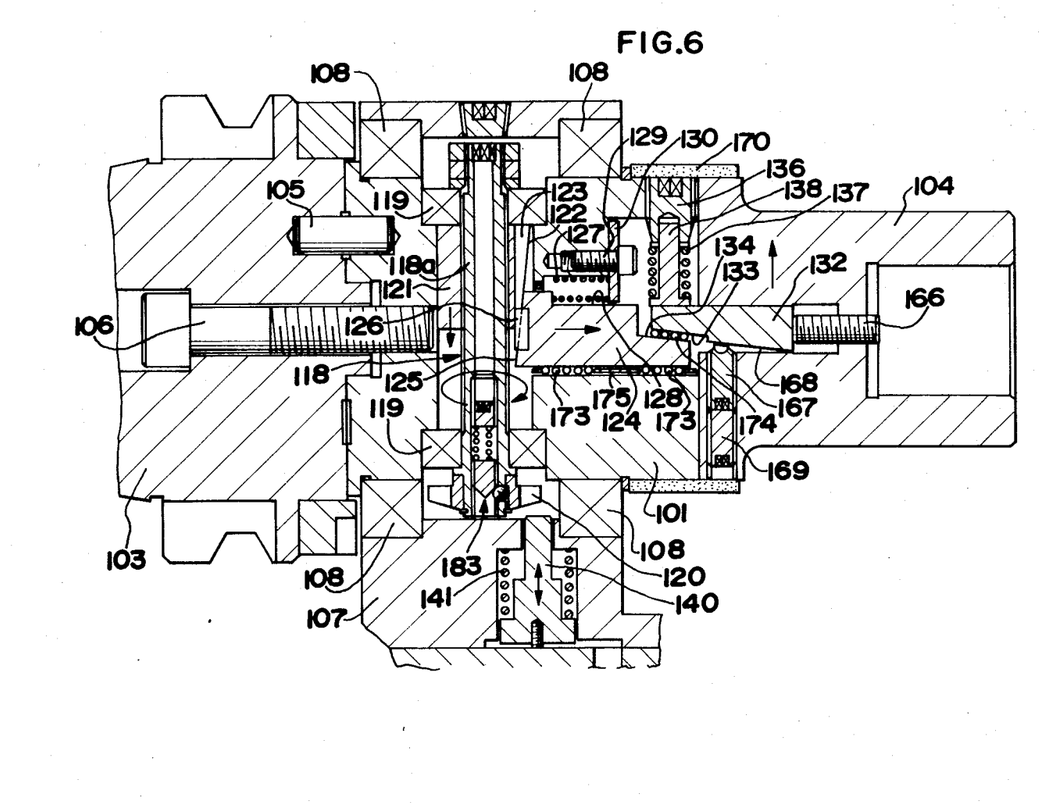
FIG. 6 is a view similar to FIG. 1, showing another preferred embodiment of the present invention.

A generally cylindrical tool holder 104 having one end adapted to support the cutting bit through the holder in a manner similar to that described in connection with the foregoing embodiment has the other end formed with a dovetail groove 131 defined therein so as to extend in a direction radially thereof. The dovetail groove 131 receives therein a dovetail projection 131a which is formed on one end of the rotary block 101 opposite to the shank 103 so that the tool holder 104 can be guided so as to move in a direction radially of the rotary block 101.

The rotary block 101 has an axial bore defined therein, in which a displacement wedge 124 is accomodated for movement axially of the rotary block 101. The displacement wedge 124 is of a generally cylindrical configuration having a shoulder defined at 128 and also having an inclined cam face 134 defined therein so as to incline at a predetermined angle relative to the longitudinal axis thereof. This displacement wedge 124 is normally biased to the left as viewed in FIG. 6 by the action of a spring 127 disposed between the shoulder 128 and a spring retainer plate 130 secured to the rotary block 101 by means of a set bolt 129.

The tool holder 104 carries a counter-wedge member 132 inserted in an axial bore in the tool holder 104 for movement in a direction axially of the tool holder 104 and parallel to the axis of rotation of the rotary block 101. The counter-wedge member 132 has an inclined cam face 133 defined therein for sliding engagement with the inclined cam face 134 in the displacement wedge 124. The distance over which one end of the counter-wedge member 132 adjacent the displacement wedge 124 projects axially outwardly from the tool holder 104 can be adjustable by turning an adjustment bolt 166 carried threadingly by the tool holder 104 with one end thereof abutting the other end of the counter-wedge member 132 remote from the displacement wedge 124. For avoiding any possible separation of the counter-wedge member 132 from the axial bore in the tool holder 104, the counter-wedge member 132 is held in position by a retainer bolt 167 adjustably carried by the tool holder 104 so as to extend radially of the tool holder 104 with one end thereof contacting an axially inclined flat face 168 which is defined in the counter-wedge member 132 at a location axially rearwardly with respect to the inclined cam face 133. For avoiding any possible loosening of the retainer bolt 167, a lock bolt 169 is employed which is inserted in the same hole as the retainer bolt 167 to confine the latter in position.

A pusher piece 138 corresponding in function to the pusher piece 38 employed in the foregoing embodiment is carried by the rotary block 101 for movement in a direction radially of the rotary block 101 by a support boss 136 having one end formed with a hole for receiving the pusher piece 138. The support boss 136 is threaded in and held in position within a hole defined in the rotary block 101. The pusher piece 138 so supported in the manner as hereinabove described is normally biased by a coil spring 137 mounted therearound such that one end of the pusher piece 138 remote from the support boss 136 is constantly held in contact with the counter-wedge member 132. Reference numeral 170 represents a dust protective elastic covering sleeve, which may be made of rubber material, mounted so as to encircle the joint between the rotary block 101 and the tool holder 104.

The indexing mechanism for axially displacing the displacement wedge 124 in response to each complete rotation of the rotary block 101 driven by the machine spindle together with the shank 103 includes a movable drive member 118 including an exteriorly threaded rod 118a, an indexing cam 121 threadingly mounted on the threaded rod 118a, and a sprocket wheel or star wheel 120 rigidly mounted on one end of the threaded rod 118a for rotation together therewith. An automatically releaseable clutch assembly 183 is interposed between the sprocket wheel 120 and the threaded rod 118a so that, in the event of the occurence of any possible overload, the connection between the threaded rod 118a and the sprocket wheel 120 can automatically be released to avoid any possible damage to the indexing mechanism. The sprocket wheel 120 is, as is the case with the foregoing embodiment, engageable with a drive pin 140 each time the rotary body 101 undergoes one complete rotation, said drive pin 140 being supported by the support barrel 107 for movement between projected and retracted positions in a direction radially of the rotary block 101.

The threaded rod 118a is rotatably, but axially non-movably supported within a radial bore in the rotary block 101 by means of a pair of spaced bearings 119 so as to extend in a direction radially of the rotary block 101. The indexing cam 121 mounted on the threaded rod 118a has an inclined cam face 122 defined therein for sliding engagement with the inclined end face 125 of the displacement wedge 124, and also has a key groove 123 defined in the inclined cam face 122. Into the groove 123 a mating key projection 126 protruding axially outwardly from the inclined end face 125 of the displacement wedge 124 is slidingly engaged.

As is the case with the drive pin 40 employed in the foregoing embodiment described with reference to and shown in FIGS. 1 to 5, the drive pin 140 is moved from the retracted position to the projected position against a biasing spring 141 when pressure is introduced into a working chamber 142 in the same manner as in the foregoing embodiment. When the drive pin 140 is in the projected position, one end of the drive pin 140 remote from the working chamber 142 is held in position ready to engage any one of the teeth of the sprocket wheel 120 so that, each time the rotary block 101 undergoes one complete rotation driven by the machine spindle, the threaded rod 118a can be turned about its own longitudinal axis to move the indexing cam 121 along the threaded rod 118a.

Between the outer peripheral surface 172 of the displacement wedge 124 and the wall 171 defining the axial bore in the rotary block 101 in which the displacement wedge 124 is movably accommodated, a plurality of minature balls 173 are interposed for facilitating a smooth axial movement of the displacement wedge 124. Similarly, a plurality of juxtaposed rollers 174 of small diameter are interposed between the inclined cam face 133 of the counter-wedge member 132 and the mating inclined cam face 134 of the displacement wedge 124 for facilitating the relative sliding movement between the displacement wedge 124 and the counter-wedge member 132. At best shown in FIGS. 8 to 10, the balls 173 are retained by a generally tubular retainer 175 in two groups, which retainer 175 with the balls 173 supported thereby is disposed within the axis bore in the rotary block 101 and exteriorly of the displacement wedge 124. The retainer 175 is made of a metal having a thickness smaller than the diameter of each of the balls 173 and has two openings 176a and 176b for accommodating the respective groups of the balls 173 as best shown in FIG. 10.

Figure 11:
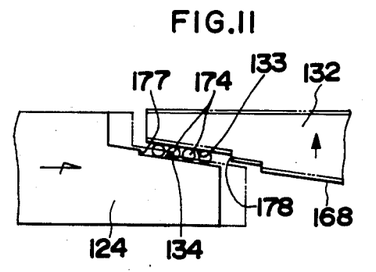
FIG. 11 is a side view of the displacement wedge and the roller elements in an assembled condition.
Figure 12:
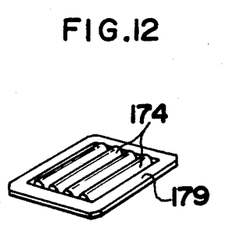
FIG. 12 is a perspective view of a roller assembly used in the tool holder unit according to the embodiment of FIG. 6.

It is to be noted that the inclined cam faces 133 and 134 of the counter-wedge member 132 and the displacement wedge 124, respectively, may have, as best shown in FIG. 11, associated shoulders defined at 178 and 177 spaced apart from each other so that the juxtaposed rollers 174 can be confined between the inclined cam faces 133 and 134 with no possibility of separation from a space therebetween. Alternatively, or in combination with the arrangement shown in FIG. 11, the juxtaposed rollers 174 may be retained by a generally rectangular retainer 179 as shown in FIG. 12 prior to the mounting of the rollers 174 in position between the inclined cam faces 133 and 134.

Figure 10:
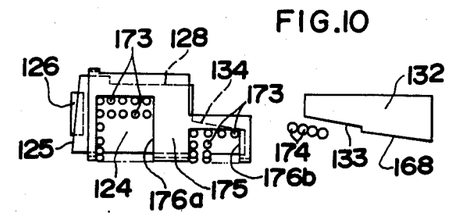
FIG. 10 is a schematic side view of an essential portion of the tool holder unit according to the embodiment shown in FIG. 1, showing the details of the displacement wedge in relation to the roller elements.
Figure 13:
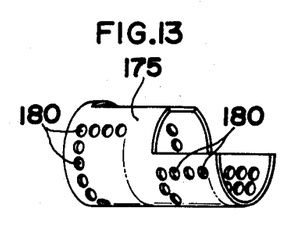
FIG. 13 is a perspective view of a retainer for retaining the roller elements used in the tool holder according to the embodiment of FIG. 6.

Moreover, although the tubular retainer 175 shown in FIG. 10 has been described as having the openings 176a and 176b for accommodating the respective groups of the balls 173, it may have a plurality of perforations 180 defined therein, in place of the openings 176a and 176b, for accommodating the respective balls 173 as shown in FIG. 13.

From the foregoing description of the embodiment shown in FIGS. 6 to 13, it is clear that the machine tool holder unit functions in a manner substantially similar to that according to the first preferred embodiment of the present invention shown in and described with reference to FIGS. 1 to 5. Specifically, during the continued rotation of the rotary block 101 in one direction, and if the drive pin 140 is in the projected position, the threaded rod 118a is turned a predetermined angle by the engagement of the drive pin 140 with one of the teeth of the sprocket wheel 120 fast with the threaded rod 118a each time the rotary block 101 undergoes one complete rotation. As the threaded rod 118a is so turned about its longitudinal axis while revolving about the longitudinal axis of the rotary block 101, the indexing cam 121 is moved axially of the threaded rod 118a thereby displacing the displacement edge 124 against the spring 127 in a direction away from the threaded rod 118a. The axial movement of the displacement wedge 124 so effected is transmitted to the tool holder 104 through the counter-wedge member 132 to move the tool holder 104 against the spring 138 in a direction radially of the rotary block 101.

The reverse rotation of the machine spindle and, hence, the rotary block 101, results in the return of the various movable parts to the initial positions.

Specifically, the embodiment shown in and described with reference to FIGS. 6 to 13 is advantageous in that the axial displacement of the displacement wedge 124 the relative slide between the displacement wedge 124 and the counter-wedge member 132 take place in a substantially frictionless manner because of the employment of bearings such as the balls 173 and the rollers 174 as hereinbefore fully described. Thus, the resistance which would act on the movement of the displacement wedge 124 is advantageously reduced and, hence, the load which may be imposed on the indexing mechanism can also be reduced with the result that the tool holder can smoothly be moved in the direction radially of the rotary block 101.

Figure 7:
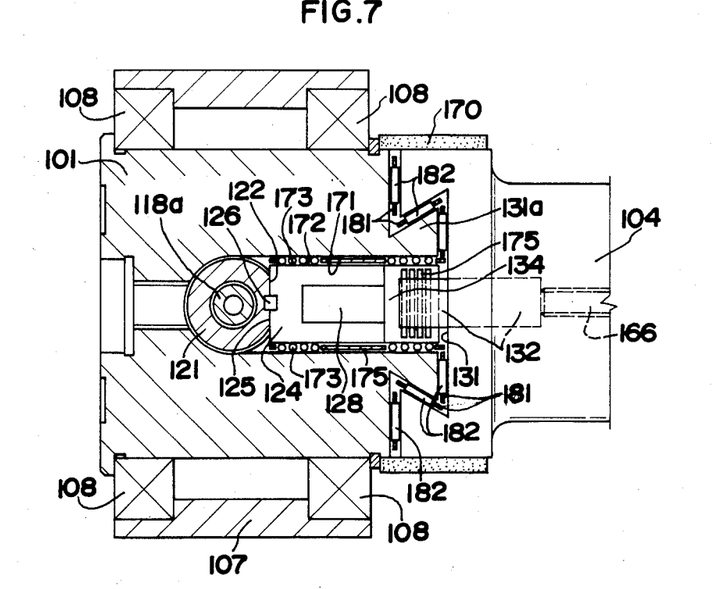
FIG. 7 is a longitudinal sectional view, on a somewhat enlarged scale, showing the relationship between the tool holder and the indexing mechanism used in the tool holder unit according to the second preferred embodiment of the present invention.
Figure 8:
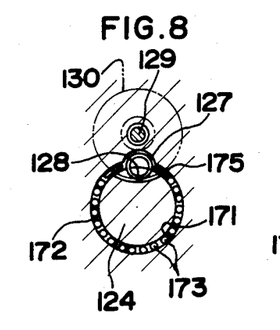
FIGS. 8 and 9 are axial sectional views, respectively, showing the manner by which the displacement wedge is supported as used in the tool holder unit shown in FIG. 6.
Figure 9:
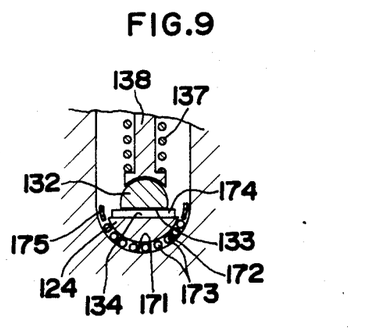

The concept of the use of the roller bearings can also be applied at the joint between the rotary block 101 and the tool holder 104. In accordance with this teaching, as best shown in FIG. 7, a plurality of roller bearings each comprising a retainer 181 and a plurality of juxtaposed rollers 182 retained in position by the respective retainer 181 are disposed between the wall surface defining the dovetail groove 131 and the wall surface of the dovetail projection 131a fast with the rotary block 101, thereby lessening the resistance which would act on the movement of the tool holder 104 relative to the rotary block 101.

Figure 14:
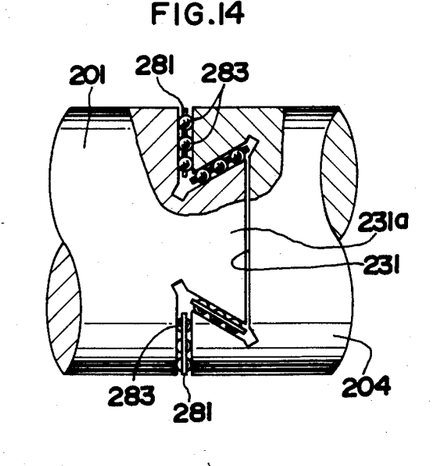
FIGS. 14, 15 and 16 are each longitudinal fragmentary sectional views, respectively, of an essential portion of the tool holder unit showing different manners by which the tool holder is movably mounted on the rotary body.

In the modification shown in FIG. 14, instead of using the juxtaposed rollers 182 retained by the respective retainers 181, roller bearings each including a perforated retainer plate 281 having therein perforations accommodating therein respective balls 283 are employed between the tool holder, designated by 204, and the rotary block 101, designated by 201. The dovetail groove in the tool holder 204 and the dovetail projection integral with the rotary block 201 are respectively by 231 and 231a.

Figure 15:
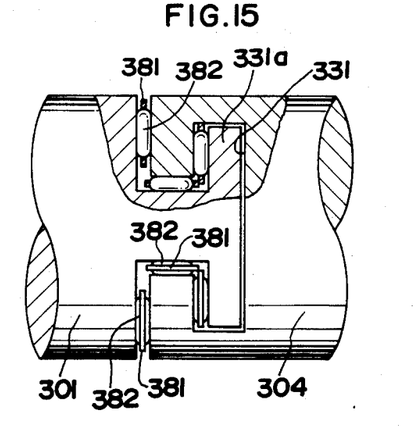
Figure 16:
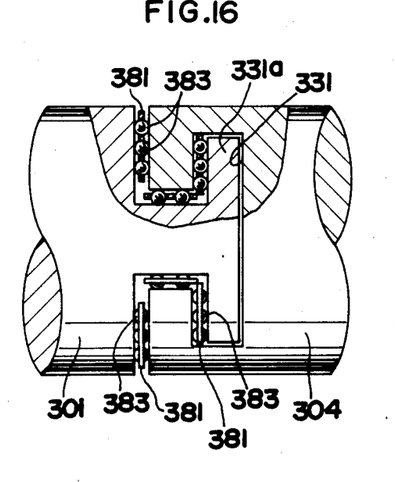

In the modification shown in FIG. 15, the tool holder 304 is radially, movably connected to the rotary block, designated by 301, by means of a generally T-sectioned groove 331, defined in the tool holder 304, and a mating T-sectioned projection 331a integral with the rotary block 301, with a plurality of roller bearings operatively interposed therebetween. The modification shown in FIG. 16 is similar to that shown in FIG. 15, but the difference resides in that, while the roller bearings employed in the modification of FIG. 15 each include a retainer 381 carrying a plurality of juxtaposed rollers 382, the roller bearings employed in the modification of FIG. 16 each include a retainer 381a having a plurality of perforations defined therein and a corresponding number of balls 383 accommodated in the perforations.

Although the present invention has been fully described in connection with the numerous embodiments thereof with reference to the accompanying drawings, it should be noted that various changes and modifications are apparent to those skilled in the art. Such changes and modifications are to be understood as included within the scope of the present invention as defined by the appended claims, unless they depart therefrom.

We claim:

1. An interchangeable machine tool holder unit for use in a machining apparatus for the support of a machine element, which comprises:
    a source of rotary drive;
    a generally elongated rotary body having ends;
    a means coupling one of said ends of the elongated rotary body to said source of rotary drive;
    a tool holder including a first supporting means supporting the machining element at one end thereof opposite to the rotary drive coupling means;
    a second supporting means provided in said rotary body supporting said tool holder for movement in a radial direction of said rotay body;
    a displaceable member which is axially displaceably carried by said rotary body;
    a first cam means transmitting the axial displacement of the displaceable member to the tool holder to move the latter in a direction radially of the rotary body; and
    an indexing mechanism intermittently moving the displaceable member in the direction axially of the rotary body each time the rotay body undergoes one complete rotation driven by the source of rotary drive, said indexing mechanism comprising an exteriorly threaded rod supported by a third supporting means within the rotary body so as to extend in a direction radially of said rotary body, a toothed wheel member mounted on one end of the threaded rod for rotation together therewith, and an indexing cam mounted on the theaded rod for movement in a direction axially to the threaded rod, said indexing cam being movable axially of and along the threaded rod as the threaded rod is turned about the longitudinal axis thereof and said displaceable member being axially moved in response to the axial movement of the indexing cam.

2. A machine tool holder unit as claimed in claim 1, wherein said toothed wheel is connected to the threaded rod through a load-responsive, automatically releasable clutch operable to disengage the toothed wheel from the threaded rod in the event of the occurence of an overload imposed thereon.

3. A machine tool holder unit according to claim 1 or 2, further comprising a support barrel mounted on the rotary body, said support barrel including a drive transmitting means for turning the threaded rod a predetermined angle about the longitudinal axis thereof each time the rotary body undergoes one complete rotation.

4. A machine tool holder unit as claimed in claim 3, wherein said drive transmitting means includes a control means controlling the transmission of the rotary motion of the rotary body to the threaded rod.

5. A machine tool holder unit as claimed in claim 3, wherein said drive transmitting means comprises a drive pin carried by the support barrel for engagement with any one of the teeth of the toothed wheel, said threaded rod being turned each time the drive pin abuts one of the teeth of the toothed wheel.

6. A machine tool holder unit as claimed in claim 5, wherein said control means comprises a biasing spring member urging the drive pin to a retracted position where the drive pin is clear of the path of rotation of the toothed wheel, and an air supply means moving the drive pin against the biasing spring member to a projected position where the drive pin is ready to engage any one of the teeth of the toothed wheel.

7. A machine tool holder unit as claimed in claim 1, wherein the first cam means includes a follower member rigidly secured to the tool holder.

8. A machine tool holder unit as claimed in claim 1, wherein the first cam means includes a counter-wedge member adjustably supported by the tool holder for adjustment in a direction axially of the rotary body and in a direction both towards and away from the displaceable member.

9. A machine tool holder united as claimed in claim 1, further comprising a first roller bearing means interposed between the peripheral surface of the displaceable member and a bore in the rotary body in which the displaceable member is movably accommodated, and a second roller bearing means interposed between a cam face, defined in the displaceable member, and a mating cam face defined in a cam element forming a part of the first cam means and carried by the tool holder facilitating the relative sliding movement between the displaceable member and the cam element.

10. A machine tool holder unit as claimed in claim 9, wherein one end of the tool holder adjacent the rotary body has a connecting groove defined therein so as to extend in a direction radially thereof, and one end of the rotary body adjacent the tool holder has a mating projection formed therein so as to extend in a direction radially thereof, said mating projection being slidably received in the connecting groove to connect the tool holder and the rotary body together, and further comprising a third roller bearing means interposed between the mating projection and the connecting groove.

11. A machine tool holder unit as claimed in claim 10, wherein said groove is a dovetail groove and said mating projection is a dovetail projection having a cross sectional shape complementary to the cross sectional shape of the dovetail groove.

12. A machine tool holder unit as claimed in claim 10, wherein said groove is of a generally T-shaped cross section and said mating projection has a cross sectional shape complementary to that of the groove.

* * * * *